United States Patent
Nam et al.

(10) Patent No.: US 9,600,714 B2
(45) Date of Patent: Mar. 21, 2017

(54) APPARATUS AND METHOD FOR CALCULATING THREE DIMENSIONAL (3D) POSITIONS OF FEATURE POINTS

(71) Applicant: SAMSUNG ELECTRONICS CO., LTD., Suwon-si (KR)

(72) Inventors: Dong Kyung Nam, Yongin-si (KR); Ju Yong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 13/667,742

(22) Filed: Nov. 2, 2012

(65) Prior Publication Data

US 2013/0136302 A1    May 30, 2013

(30) Foreign Application Priority Data

Nov. 25, 2011  (KR) .......... 10-2011-0124422

(51) Int. Cl.
  *G06K 9/00* (2006.01)
  *G06T 7/00* (2006.01)

(52) U.S. Cl.
  CPC ..... *G06K 9/00281* (2013.01); *G06K 9/00604* (2013.01); *G06T 7/0042* (2013.01); *G06T 2207/10004* (2013.01); *G06T 2207/10012* (2013.01); *G06T 2207/30201* (2013.01); *G06T 2207/30241* (2013.01)

(58) Field of Classification Search
  CPC .......... H04N 13/0402; H04N 13/0007; H04N 13/0011; H04N 13/0484; H04N 2213/007; H04N 13/00; G02B 27/0093; G06T 2207/10021; G06T 7/002
  See application file for complete search history.

(56) References Cited

U.S. PATENT DOCUMENTS

| | | | |
|---|---|---|---|
| 5,311,220 A * | 5/1994 | Eichenlaub | 348/55 |
| 6,075,557 A * | 6/2000 | Holliman et al. | 348/51 |
| 2006/0139447 A1* | 6/2006 | Unkrich | 348/51 |
| 2006/0210111 A1* | 9/2006 | Cleveland et al. | 382/103 |
| 2010/0214395 A1 | 8/2010 | Haussler | |
| 2011/0149034 A1 | 6/2011 | Tsukagoshi | |
| 2011/0228975 A1* | 9/2011 | Hennessey et al. | 382/103 |
| 2012/0170027 A1* | 7/2012 | Tsukizawa et al. | 356/124 |

(Continued)

FOREIGN PATENT DOCUMENTS

| | | |
|---|---|---|
| CN | 101489467 A | 7/2009 |
| CN | 101815174 A | 8/2010 |

(Continued)

OTHER PUBLICATIONS

Fehn et al., "Key Technologies for an Advanced 3D-TV System", 2004, Proceedings of SPIE, vol. 5599.*

(Continued)

*Primary Examiner* — Vu Le
*Assistant Examiner* — Guillermo Rivera-Martinez
(74) *Attorney, Agent, or Firm* — NSIP Law

(57) ABSTRACT

An apparatus for calculating spatial coordinates is disclosed. The apparatus may extract a plurality of feature points from an input image, calculate a direction vector associated with the feature points, and calculate spatial coordinates the feature points based on a distance between the feature points and the direction vector.

17 Claims, 6 Drawing Sheets

(56) References Cited

U.S. PATENT DOCUMENTS

2013/0156265 A1* 6/2013 Hennessy .................. 382/103

FOREIGN PATENT DOCUMENTS

| JP | 10-304244 | | 11/1998 |
|----|-----------|---|---------|
| JP | 2008-261756 | | 10/2008 |
| JP | 2009-258884 | | 11/2009 |
| JP | 2011-70432 | * | 4/2011 |
| KR | 10-2006-0134153 | | 12/2006 |
| KR | 10-2007-0061091 | | 6/2007 |
| KR | 10-2010-0109257 | | 10/2010 |

OTHER PUBLICATIONS

Chen et al., "Video-based eye tracking for autostereoscopic displays", 2001, Optical Engineering, vol. 40 No. 12, pp. 2726-2734.*

Kaminski, Jeremy Yirmeyahi, J. Y. Teicher, and A. Shavit. "Head Orientation and Gaze Detection From a Single Image." International Conference of Computer Vision Theory and Applications. 2006, 85-92, Israel.

Ebisawa, Yoshinobu. "Robust Pupil Detection by Image Difference With Positional Compensation." Virtual Environments, Human-Computer Interfaces and Measurements Systems, 2009. VECIMS'99. IEEE International Conference on. IEEE, 2009, Hamamatsu, Japan.

Extended European Search Report issued on May 11, 2015 in counterpart European Application No. 12193570.4 (5 pages in English).

Chinese Office Action issued on Jan. 27, 2016 in counterpart Chinese Application No. 201210468779.0. (25 pages with English translation).

Chinese Office Action issued on Oct. 24, 2016 in counterpart Chinese Application No. 201210468779.0. (21 pages in Chinese with English translation).

* cited by examiner

100

APPARATUS AND METHOD FOR CALCULATING THREE DIMENSIONAL (3D) POSITIONS OF FEATURE POINTS

CROSS-REFERENCE TO RELATED APPLICATIONS

This application claims the priority benefit of Korean Patent Application No. 10-2011-0124422, filed on Nov. 25, 2011, in the Korean Intellectual Property Office, the disclosure of which is incorporated herein by reference.

BACKGROUND

1. Field

Example embodiments relate to an apparatus and method for calculating a three dimensional (3D) position of a feature point, and more particularly, to an apparatus and method for detecting a feature point on a space and calculating 3D coordinates of each feature point.

2. Description of the Related Art

Currently, beyond a simple function of an image capturing apparatus that photographs a neighbor landscape or a human, a camera may be used to readily input various information associated with peripheral environments of the camera.

For example, a camera of a smart phone may be used to recognize a barcode or a quick response (QR) code. A camera interacting with a video game may sense a motion of a human.

A function of tracking a position or a motion of an object may be recognized in a three dimensional (3D) display, a security camera, and the like. Accordingly, these fields may use a function of identifying and tracking an object or a feature point, for example, a position of a human eye using a camera.

For example, an auto-stereoscopic 3D display and a multi-view display may be proposed as subsequent technology of a currently widely commercialized and distributed stereoscopic 3D display. In the auto-stereoscopic 3D display and the multi-view display, it may be an important issue to generate a left eye image and a right eye image to be suitable for positions of a left eye and a right eye of the human. Accordingly, there is a desire for a method of accurately and quickly calculating a position of a human eye.

SUMMARY

The foregoing and/or other aspects may be achieved by providing an apparatus for calculating spatial coordinates, which may comprise a feature point extractor to extract a plurality of feature points from an input image, a direction vector calculator to calculate a direction vector associated with the plurality of feature points, and a spatial coordinate calculator to calculate spatial coordinates of each of the plurality of feature points based on a distance between the plurality of feature points within the input image and the direction vector.

The apparatus for calculating spatial coordinates may further include an image generator that is a single camera module to generate the input image by photographing an object.

The feature point extractor may extract, from the input image, a plurality of feature points corresponding to eyes of a human.

The direction vector calculator may calculate the direction vector corresponding to a front direction of a human face included in the input image by applying a human face mask to the input image.

The distance between the plurality of feature points may be a calibrated value based on a user setting.

The foregoing and/or other aspects may be achieved by providing an apparatus for calculating spatial coordinates, which may comprise an image generation apparatus to generate an input image by photographing a face of a human, a feature point extractor to extract, from the input image, a first feature point corresponding to a left eye of the human and a second feature point corresponding to a right eye of the human, and a spatial coordinate calculator to calculate 3D spatial coordinates of each of the first feature point and the second feature point using distance information associated with a distance between the left eye of the human and the right eye of the human.

The image generation apparatus may be a single camera module to generate the input image by photographing the face of the human.

The apparatus for calculating spatial coordinates may further include a direction vector calculator to calculate a direction vector corresponding to a front direction of a face of the human by analyzing the input image. The spatial coordinate calculator may calculate the 3D spatial coordinates of the first feature point and the second feature point using the distance information and the direction vector.

The direction vector calculator may calculate the direction vector by applying a human face mask model to the input image.

The spatial coordinate calculator may calculate a direction from the image generation apparatus towards each of the first feature point and the second feature point based on a pixel index of each of the first feature point and the second feature point within the input image, and may use the calculated direction to calculate the 3D spatial coordinates of each of the first feature point and the second feature point.

The foregoing and/or other aspects may be achieved by providing a method of calculating spatial coordinates, which may comprise extracting a plurality of feature points from an input image, calculating a direction vector associated with the plurality of feature points, and calculating spatial coordinates of each of the plurality of feature points based on a distance between the plurality of feature points within the input image and the direction vector.

The foregoing and/or other aspects may be achieved by providing a method of calculating spatial coordinates, which may comprise generating, by a single camera module, an input image by photographing a face of a human, extracting, from the input image, a first feature point corresponding to a left eye of the human and a second feature point corresponding to a right eye of the human, and calculating 3D spatial coordinates of each of the first feature point and the second feature point using distance information associated with a distance between the left eye of the human and the right eye of the human.

According to the example embodiments, 3D positions of feature points having varying spatial positions may be calculated using only a single camera and thus, it is possible to save camera apparatus resources used to track a position of an eye and the like.

According to the example embodiments, in an aspect of raw price or design, it may be possible to track an eye of a human to be applicable to a 3D display and the like, and calibration may be reflected for each user. Therefore, the example embodiments may be suitable for a user specified 3D display or game player, and the like.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
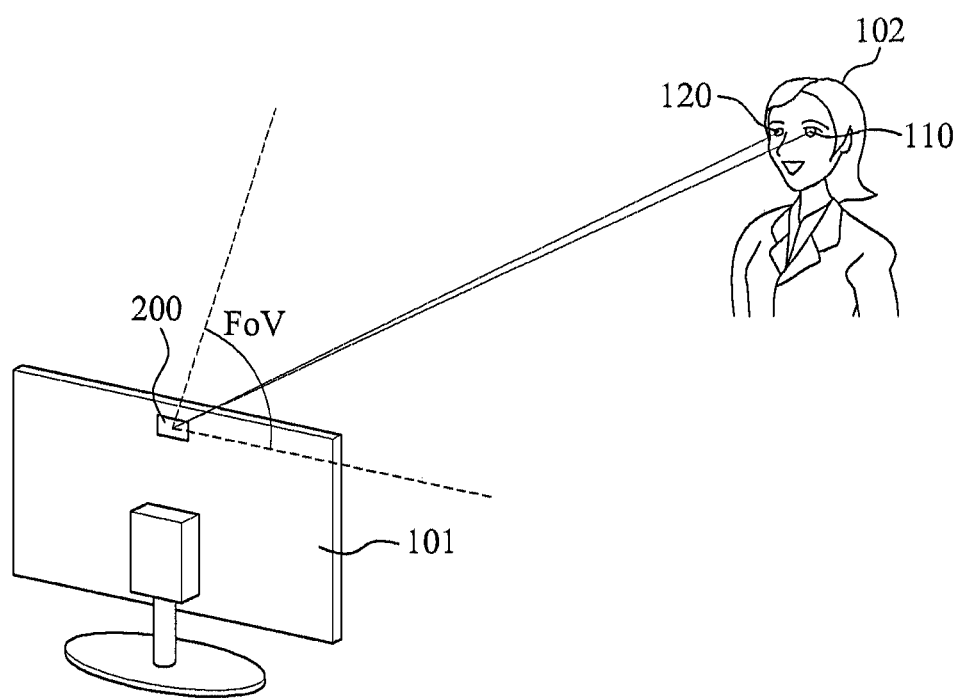
FIG. 1 illustrates an application example in which an apparatus for calculating spatial coordinates may be provided in a display device according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an application example 100 in which an apparatus for calculating spatial coordinates 200 may be provided in a display device 101 according to an embodiment.

Referring to FIG. 1, the apparatus for calculating spatial coordinates 200 may be used for the display device 101 to calculate spatial coordinates of a left eye 110 and a right eye 120 of a human 102.

However, the above application example 100 is only an example and thus, various applications and modifications may be applied without departing from the spirit of the embodiments. Accordingly, even though description will be made based on an example in which the display device 101 calculates spatial coordinates of the left eye 110 and the right eye 120 of the human 102, the embodiments are not limited thereto.

A single camera module may be included in the apparatus for calculating spatial coordinates 200, which will be described again with reference to FIG. 2.

When photographing a face of the human 102 that is positioned within a field of view (FoV) of a single camera module, the apparatus for calculating spatial coordinates 200 may track positions of both eyes, for example, the left eye 110 and the right eye 120 from a photographed image, and may quickly calculate spatial positions of the left eye 110 and the right eye 120 according to the following method.

In a conventional art, it is difficult to accurately calculate spatial coordinates of both eyes from the photographed image using a single camera. In general, a camera image may be expressed by projecting a 3D space onto a two dimensional (2D) plane. Therefore, with respect to an object photographed using the camera, only a direction may be known from a camera view and a 3D position may not be verified.

Accordingly, in the conventional art, an image may be acquired using each of at least two cameras positioned in different positions in a 3D space, and spatial coordinates of both eyes of a human may be determined using the acquired images according to a triangulation scheme. Due to an increase in costs resulting from an increase in the number of cameras, a necessity for optical matching between a plurality of cameras and a temporal synchronization between the plurality of cameras, and the like, the conventional method may not be applied for an actual product.

For example, when at least two cameras are provided in a smart phone and the like to photograph a user face and to verify a spatial position for 3D image expression or video phone in the smart phone, costs and a size of the smart phone may increase.

According to an embodiment, a more efficient and suitable method may calculate 3D position, that is, spatial coordinates of a desired feature point using a single camera. Embodiments will be further described with reference to FIG. 2 through FIG. 6.

Figure 2:
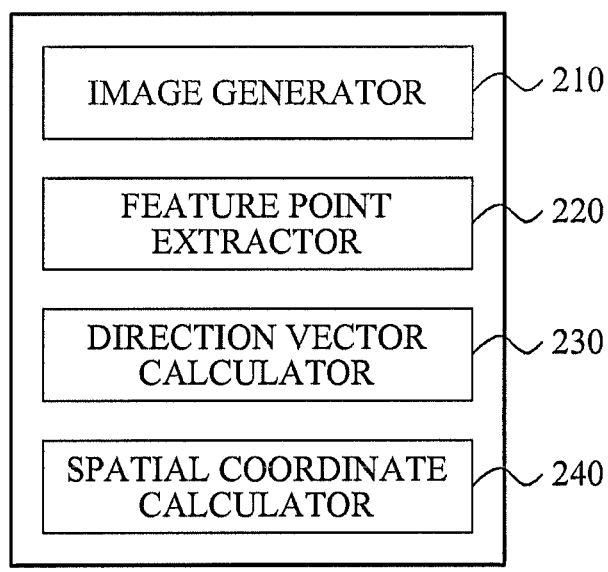
FIG. 2 illustrates a configuration of an apparatus for calculating spatial coordinates according to an embodiment.

FIG. 2 illustrates a configuration of the apparatus for calculating spatial coordinates 200 according to an embodiment.

An image generator 210 may include a single camera to generate an input image by photographing a face of a human that is an object, and the like. The input image may be understood as, for example, a digital color image.

A feature point extractor 220 may extract, from the input image, feature points of which spatial coordinates are desired to be calculated, for example, the left eye 110 and the right eye 120 of the human 102 of FIG. 1. An algorithm of extracting a position of an eye from an image is widely introduced in the art and thus, further description will be omitted here.

In addition to feature points extracted from the input image, a distance between the feature points may be used as a predetermined value or a real-time input value.

The distance between the feature points may be the average inter pupil distance (IPD) of a human. Even though an IPD may be slightly different based on a sex, an age, and a race of a human, the difference may be about 6 cm.

An IPD value may be used to calculate a spatial position of each feature point, for example, a left eye and a right eye. Even though the IPD value is an input value, the IPD value is not a fixed constant and may be a value that can be calibrated based on a human that is an object.

A direction vector calculator 230 may calculate a direction vector of a face front of a photographed human by applying a human face mask model to the input image. Also, in another exemplary embodiment, the direction vector calculator 230 may calculate the direction vector by matching a 3-Dimensional Morph Model with the face of a human. The direction vector calculator 230 calculates a direction vector corresponding to a front direction of a face of the human by comparing the input image with a human face mask model, The calculating of the direction vector may correspond to calculating of Face Normal Vector in U.S. Pat. No. 6,556,196 ("Method and apparatus for the processing of images", Blanz et al.), filed on Mar. 17, 2000, which is incorporated herein by reference in its entirety.

A spatial coordinate calculator 240 may calculate coordinates of each of feature points using the direction vector, information associated with a direction of each of the feature points from a camera view included in the image generator 210, and the IPD.

A calculation process will be further described with reference to FIG. 3 through FIG. 5.

Figure 3:
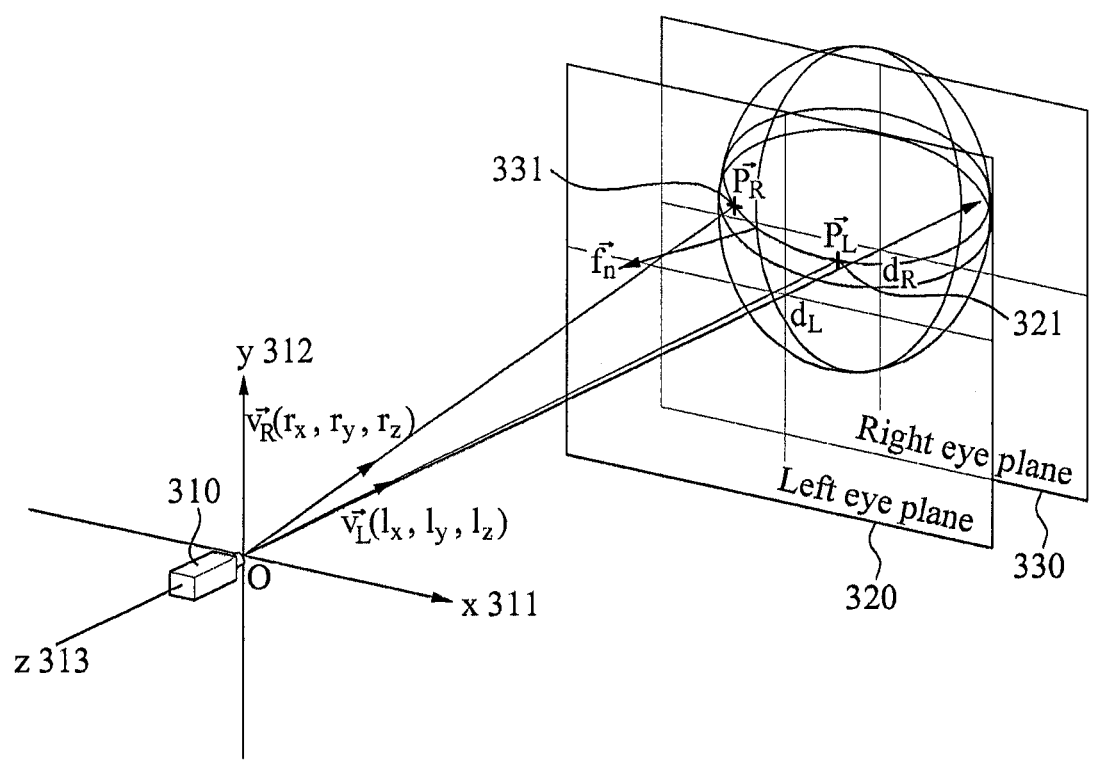
FIG. 3 illustrates a spatial arrangement of an image generation apparatus and eyes according to an embodiment.

FIG. 3 illustrates a spatial arrangement of an image generation apparatus and eyes according to an embodiment.

A camera 310 may correspond to an integrated camera module that is included in the image generator 210 of FIG. 2. Hereinafter, for ease of description, a coordinate system may be set to locate a projection center point of the camera 310 at the origin O. A position vector from the origin O to a left eye 321 of a human may be expressed as $P_L$ and a position vector from the origin to a right eye 331 may be expressed as $P_R$.

Also, a direction vector from the origin O to the left eye 321 may be expressed as $v_L$, and a component of the direction vector $v_L$ may be expressed as $(l_x, l_y, l_z)$. A direction vector from the origin O to the right eye 331 may be expressed as $v_R$ and a component of the direction vector $v_R$ may be expressed as $(r_x, r_y, r_z)$.

Here, the direction vector $v_L$ and the direction vector $v_R$ may be unit vectors that have direction components such as the position vector $P_L$ and the position vector $P_R$, respectively, and have a size of "1".

$d_L$ denotes a distance from the origin O to the left eye 321 corresponding to a direction of a z axis 313 and may be understood as a z axial direction component value of $P_L$.

Similarly, $d_R$ denotes a distance from the origin O to the right eye 331 corresponding to the direction of the z axis 313.

In association with the camera 310, hFoV indicates a horizontal field of view and vFoV indicates a vertical field of view. Also, hRes indicates a horizontal pixel resolution of an image photographed using the camera 310, and vRes indicates a vertical pixel resolution of the image.

As described above, the IPD indicates the inter pupil distance, that is, the distance between the left eye 321 and the right eye 331. Vector $f_n$ may be a direction vector indicating a direction faced by the face, and may indicate a direction that is perpendicular to a straight line connecting the left eye 321 and the right eye 331 and that is faced by a front of the face. A left eye plane 320 may be a virtual plane that includes the left eye 321 and is parallel with xy plane including an x axis 311 and a y axis 312 of a coordinate system. A right eye plane 330 may be a virtual plane that includes the right eye 331 and is parallel with the xy plane.

Hereinafter, a method of the direction vector calculator 230 to calculate direction vectors $v_L$ and $v_R$ according to an embodiment will be described with reference to FIG. 4.

Figure 4:
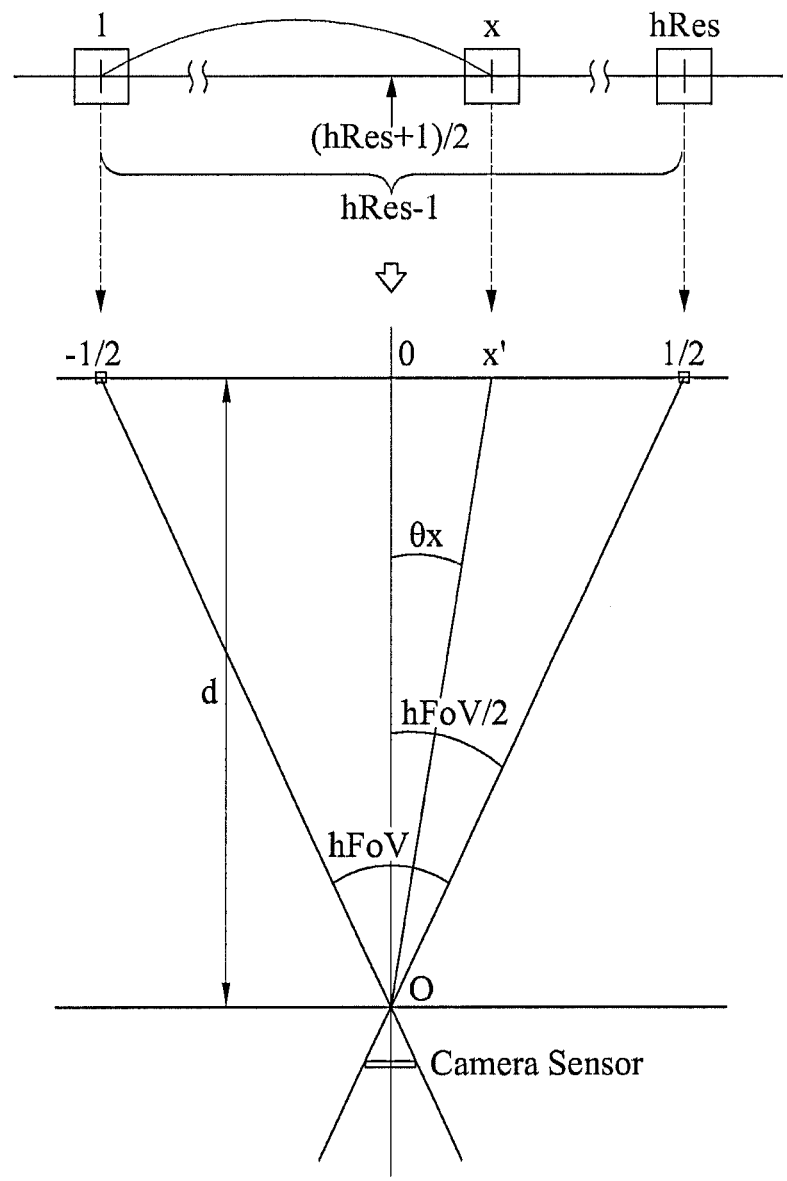
FIG. 4 is a diagram to describe a process of calculating a direction of an eye in a generated input image according to an embodiment.

FIG. 4 is a diagram to describe a process of calculating a direction of an eye in a generated input image according to an embodiment.

As shown in FIG. 4, a single eye, for example, a left eye in a photographed input image may be assumed to be positioned at an $x^{th}$ pixel in the horizontal direction. When x' indicates a value obtained by normalizing a horizontal direction pixel value to $(-\frac{1}{2}, \frac{1}{2})$, x' may be expressed by the following Equation 1:

$$x' = \frac{x - \frac{hRes + 1}{2}}{hRes - 1} \quad \text{Equation 1}$$

An angle of x' at the origin O may be expressed with respect to $\theta_x$ as given by the following Equation 2 and Equation 3:

$$d\tan\theta_x = x' \quad \text{Equation 2}$$

$$d\tan\frac{hFoV}{2} = \frac{1}{2} \quad \text{Equation 3}$$

Here, d denotes the normalized z axial direction distance. The following Equation 4 may be induced from Equation 2 and Equation 3:

$$\tan\theta_x = 2x' \cdot \tan\frac{hFoV}{2} \quad \text{Equation 4}$$

Accordingly, $\theta_x$ may be calculated according to Equation 5:

$$\theta_x = \tan^{-1}\left(2x' \cdot \tan\frac{hFoV}{2}\right)$$

$$= \tan^{-1}\left(\frac{2x - (hRes + 1)}{hRes - 1} \cdot \tan\frac{hFoV}{2}\right) \quad \text{Equation 5}$$

$\theta_y$ may be calculated according to Equation 6:

$$\theta_y = \tan^{-1}\left(\frac{2y - (vRes + 1)}{vRes - 1} \cdot \tan\frac{vFoV}{2}\right) \quad \text{Equation 6}$$

In this example, the direction vector v may be calculated according to Equation 7:

$$\vec{v}(\cos\theta_x, \cos\theta_y, \sqrt{1-\cos^2\theta_x-\cos^2\theta_y}) \quad \text{Equation 7}$$

Accordingly, the direction vector $v_L$ of the left eye 321 and the direction vector $v_R$ of the right eye 331 may be calculated according to Equation 8 and Equation 9, respectively:

$$\vec{v_L}(\cos\theta_{xL}, \cos\theta_{yL}, \sqrt{1-\cos^2\theta_{xL}-\cos^2\theta_{yL}}) \quad \text{Equation 8}$$

$$\vec{v_R}(\cos\theta_{xR}, \cos\theta_{yR}, \sqrt{1-\cos^2\theta_{xR}-\cos^2\theta_{yR}}) \quad \text{Equation 9}$$

In addition, the following calculations may be performed:

$$\theta_{xL} = \tan^{-1}\left(\frac{2x_L - (hRes + 1)}{hRes - 1} \cdot \tan\frac{hFoV}{2}\right) \quad \text{Equation 10}$$

$$\theta_{yL} = \tan^{-1}\left(\frac{2y_L - (vRes + 1)}{vRes - 1} \cdot \tan\frac{vFoV}{2}\right) \quad \text{Equation 11}$$

$$\theta_{xR} = \tan^{-1}\left(\frac{2x_R - (hRes + 1)}{hRes - 1} \cdot \tan\frac{hFoV}{2}\right) \quad \text{Equation 12}$$

$$\theta_{yR} = \tan^{-1}\left(\frac{2y_R - (vRes + 1)}{vRes - 1} \cdot \tan\frac{vFoV}{2}\right) \quad \text{Equation 13}$$

In the above equations, $x_L$ and $y_L$ indicate a horizontal direction pixel position and a vertical direction pixel position based on the left eye 321 of the photographed image, respectively. $x_R$ and $y_R$ indicate a horizontal direction pixel position and a vertical direction pixel position based on the right eye 331 of the photographed image, respectively.

When the direction vector of the left eye 321 and the direction vector of the right eye 331 are calculated, position vectors of the left eye 321 and the right eye 331 may be calculated, which will be described with reference to FIG. 5.

Figure 5:
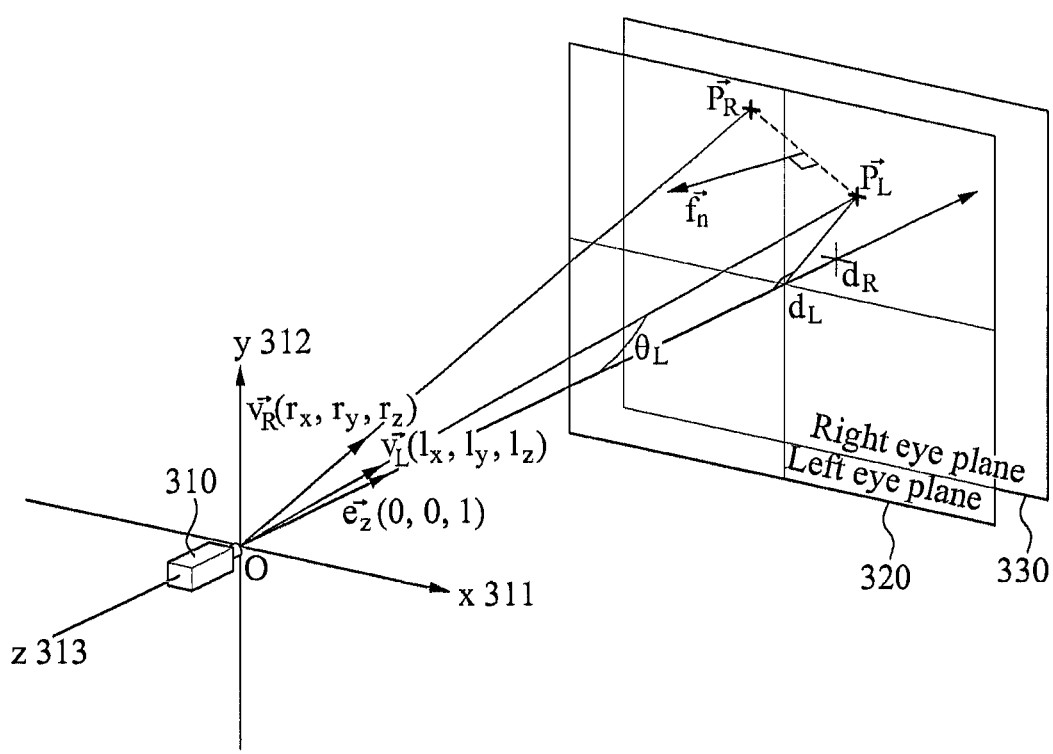
FIG. 5 is a diagram to describe a process of calculating position vectors of two eyes and a direction vector of a face according to an embodiment.

FIG. 5 is a diagram to describe a process of calculating position vectors of two eyes and a direction vector of a face according to an embodiment.

When the position vector $P_L$ of the left eye 321 is calculated, the following Equation 14 may be obtained:

$$\vec{P_L} = \frac{d_L}{\cos\theta_L}\vec{v_L} = \frac{d_L}{\vec{e_Z}\cdot\vec{v_L}}\vec{v_L} = \frac{d_L}{l_z}\vec{v_L} \qquad \text{Equation 14}$$

$$= d_L\left(\frac{l_x}{l_z}, \frac{l_y}{l_z}, 1\right)$$

Similarly, when the position vector $P_R$ of the right eye 331 is calculated, the following Equation 15 may be obtained:

$$\vec{P_R} = \frac{d_R}{r_z}\vec{v_R} = d_R\left(\frac{r_x}{r_z}, \frac{r_y}{r_z}, 1\right) \qquad \text{Equation 15}$$

In Equation 14 and Equation 15, when $d_L$ and $d_R$ are determined, positions of eyes may be known. To determine $d_L$ and $d_R$, the following Equation 16 and Equation 17 may be employed:

$$(\vec{P_L}-\vec{P_R})\cdot\vec{f_n}0 \qquad \text{Equation 16}$$

$$|\vec{P_L}-\vec{P_R}|\cdot\vec{f_n}IPD \qquad \text{Equation 17}$$

Using Equation 14 and Equation 15, Equation 16 may be arranged to the following Equation 18:

$$\frac{d_L}{l_z}\vec{v_L}\cdot\vec{f_n} - \frac{d_R}{r_z}\vec{v_R}\cdot\vec{f_n} = 0 \qquad \text{Equation 18}$$

Accordingly, the z axial direction distance $d_L$ of the left eye 321 may be calculated according to Equation 19:

$$d_L = \frac{l_z}{r_z}\frac{\vec{v_R}\cdot\vec{f_n}}{\vec{v_L}\cdot\vec{f_n}}d_R \qquad \text{Equation 19}$$

$$= \frac{l_z}{r_z}\alpha d_R$$

$$\alpha = \frac{\vec{v_R}\cdot\vec{f_n}}{\vec{v_L}\cdot\vec{f_n}} \qquad \text{Equation 20}$$

Using Equation 14, Equation 15, and Equation 19, Equation 17 may be arranged to the following Equation 21:

$$|\vec{P_L}-\vec{P_R}| = \left|\frac{d_R}{r_z}\alpha\vec{v_L} - \frac{d_R}{r_z}\vec{v_R}\right| \qquad \text{Equation 21}$$

$$= \frac{d_R}{r_z}|\alpha\vec{v_L} - \vec{v_R}| = IPD$$

The z axial direction distance of the right eye 331 may be calculated according to Equation 22:

$$d_R = \frac{r_z IPD}{|\alpha\vec{v_L}-\vec{v_R}|} \qquad \text{Equation 22}$$

By replacing Equation 19 with the calculated value, the z axial direction distance of the left eye 321 may also be calculated according to Equation 23:

$$d_L = \frac{l_z IPD}{|\vec{v_L}-\vec{v_R}/\alpha|} \qquad \text{Equation 23}$$

3D spatial coordinate values of the left eye 321 and the right eye 331, that is, the position vectors $P_L$ and $P_R$ may be calculated according to Equation 24 and Equation 25, respectively:

$$\vec{P_L} = \frac{d_L}{l_z}\vec{v_L} = \frac{IPD}{|\vec{v_L}-\vec{v_R}/\alpha|}\vec{v_L} \qquad \text{Equation 24}$$

$$\vec{P_R} = \frac{d_R}{r_z}\vec{v_R} = \frac{IPD}{|\alpha\vec{v_L}-\vec{v_R}|}\vec{v_R} \qquad \text{Equation 25}$$

Here, $\alpha$ may be a value defined in Equation 20.

According to the aforementioned method, the spatial coordinate calculator 240 may accurately calculate 3D coordinate values of both eyes using an image photographed by a single camera, an IPD value, and a face direction vector $f_n$.

Figure 6:
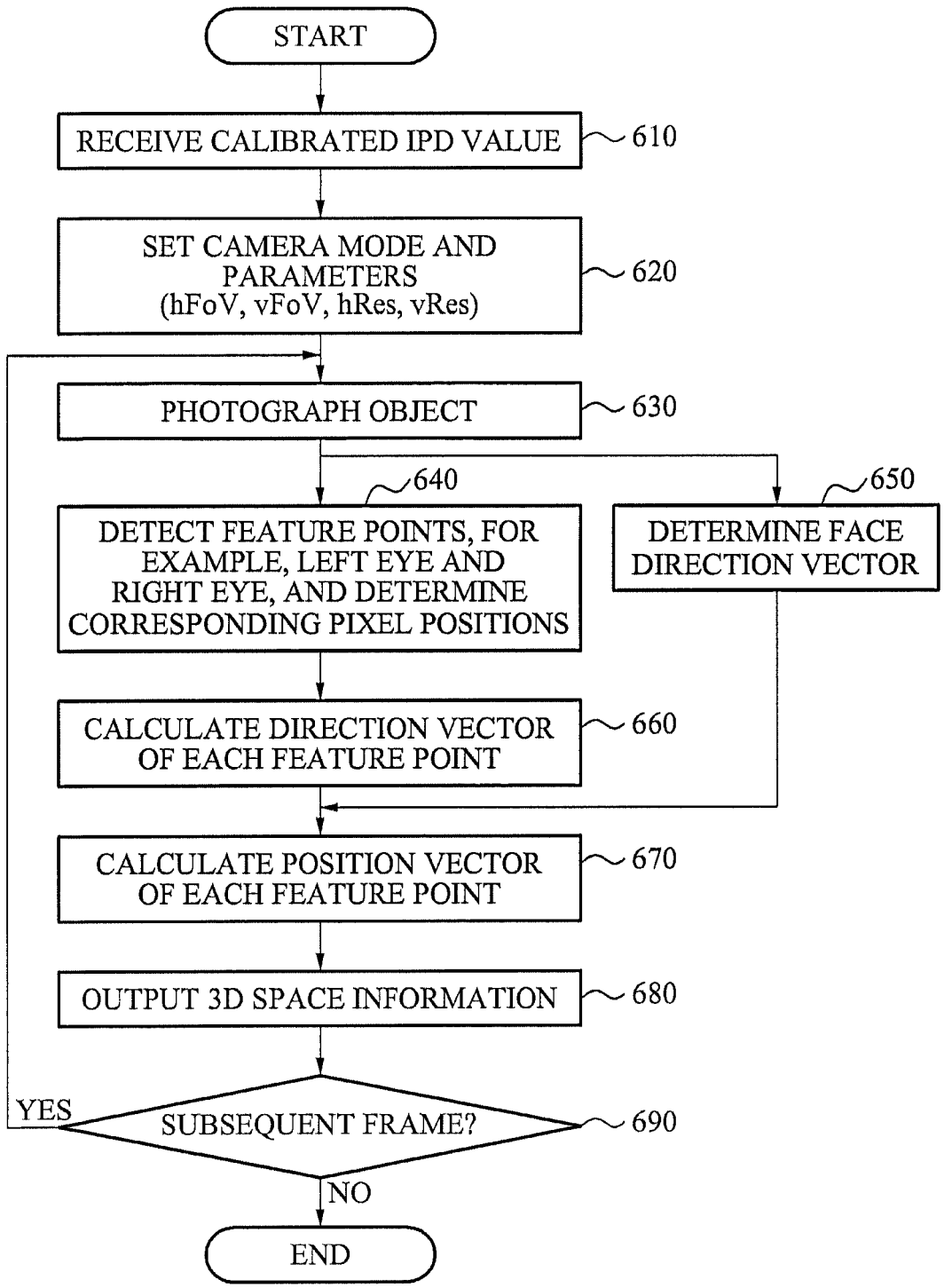
FIG. 6 illustrates a method of calculating a position of a feature point according to an embodiment.

FIG. 6 illustrates a method of calculating a position of a feature point according to an embodiment.

Due to an IPD value that may be different for each individual, an error may occur in a calculation result. In operation 610, an IPD value calibrated to be suitable for a user may be input in order to decrease the error. Operation 610 may be optionally performed. When a user IPD input is omitted, a default value, for example, a value of about 6 cm may be set as the IPD value and be used for calculation.

In operation 620, camera parameters, for example, hFoV, vFoV, hRes, and vRes, a camera mode, and the like, may be set. Operation 620 may also be optimally performed.

In operation 630, the image generator 210 may generate an image by photographing an object.

When the generated image is given, the feature point extractor 220 may detect feature points corresponding to positions of both eyes of a human in which pixels are photographed within the image. With respect to a pixel index of a feature point, a left eye position may be indicated as $(x_L, y_L)$ and a right eye position may be indicated as $(x_R, y_R)$.

In operation 650, the direction vector calculator 230 may determine a face direction vector $f_n$ by analyzing a face of the object corresponding to a current frame image. The face direction vector $f_n$ may be calculated from the photographed image using a method of learning a 3D feature point model of the face and matching the learned 3D feature point model with the photographed image.

In operation 660, a direction vector of each feature point may be calculated according to the above equations.

Using Equation 8 through Equation 13, direction vectors of eyes that are feature points may be calculated based on the input camera parameters and pixel position information of eyes.

In operation 670, using Equation 24 and Equation 25, the spatial coordinate calculator 240 may calculate the position vectors $P_L$ and $P_R$ of eyes based on the calculated direction vectors of the eyes, the input IPD value, and face direction vector information. In operation 680, the calculated position vector components of the left eye and the right eye may be transferred or output as 3D space information.

When a subsequent frame is continuously input and there is a need to continuously update position coordinates based on a camera mode, a process followed by operation 630 may be repeated depending on the determination of operation 690.

The aforementioned embodiment has described a case where the face direction vector $f_n$ is perpendicular to a straight line that passes two eyes. If $f_n$ is not perpendicular to the straight line between the two eyes, only Equation 16 may be replaced with the following Equation 26:

$$(\vec{P_L} - \vec{P_R}) \cdot \vec{f_n} = |\vec{P_L} - \vec{P_R}| \cos\theta \qquad \text{Equation 26}$$
$$= IPD\cos\theta$$

In Equation 26, $\theta$ denotes an angle between the face direction vector and the straight line passing two eyes. Since the face direction vector $f_n$ is not perpendicular to a straight line that passes two eyes, the value of cosine $\theta$ is not zero. Therefore Equation 26 may be used instead of Equation 16 to calculate the position vectors $P_L$ and $P_R$ of eyes by Equations 18-25.

The above process is described with reference to FIG. 3 through FIG. 5 and thus, further description will be omitted here.

According to embodiments, 3D spatial position information associated with feature points of an object, for example, a left eye and a right eye may be quickly and accurately calculated from an image photographed using only a single camera.

According to embodiments, compared to an existing stereo camera scheme, an apparatus structure may be simplified and corresponding costs may decrease. Therefore, the embodiments may be suitable for production. In a 3D display device, a motion sensing field, a robot system, and the like, a position of a feature point may be very efficiently calculated.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for calculating spatial coordinates of a user's eyes, comprising:
    a feature point extractor configured to extract feature points from a single input image of an object;
    an image generator that is a single camera module configured to generate the input image by photographing the object;
    a direction vector calculator configured to calculate, by a processor, an object direction vector based on the single input image, and a feature direction vector based on position of the feature points in the single input image; and
    a spatial coordinate calculator configured to calculate, by a processor, spatial coordinates of a feature point based on a pre-established reference distance, the feature direction vector, and the object direction vector, wherein the spatial coordinate calculator is further configured to output the spatial coordinates to an autostereoscopic display, wherein the pre-established reference distance is associated with a distance between the eyes of a reference human or a calibrated value based on a user setting, wherein the extracted feature points comprise the eyes of the user, wherein the feature direction vector is a vector between the center point of the single camera module and the respective feature point, wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

2. The apparatus of claim 1, wherein the direction vector calculator is further configured to calculate the object direction vector based on a facing direction of the human face included in the input image by applying a human face model to the input image.

3. An apparatus for calculating spatial coordinates, comprising:
    an image generation apparatus configured to generate a single input image by photographing a human face;
    wherein the image generation apparatus is a single camera module configured to generate the input image by photographing the human face;
    a feature point extractor configured to extract, from the single input image, a first feature point corresponding to a left eye of the human and a second feature point corresponding to a right eye of the human;

a direction vector calculator configured to calculate, by a processor, a face direction vector based on a model of a human face and the single input image; and a spatial coordinate calculator configured to calculate, by a processor, three dimensional (3D) spatial coordinates of the first feature point and the second feature point using a pre-established reference distance, a feature direction vector, and the face direction vector, wherein the pre-established reference distance is associated with a distance between the left eye of a reference human and the right eye of a reference human, wherein the direction vector calculator is further configured to calculate the feature direction vector from the center point of the single camera module to a corresponding feature point, wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

4. The apparatus of claim 3, wherein the direction vector calculator is further configured to calculate the face direction vector by applying a human face model to the input image.

5. The apparatus of claim 3, wherein the spatial coordinate calculator is further configured to calculate a direction from the image generation apparatus towards each of the first feature point and the second feature point based on a pixel index of each of the first feature point and the second feature point within the input image, and uses the calculated direction to calculate the 3D spatial coordinates of each of the first feature point and the second feature point.

6. A method of calculating spatial coordinates of a user's eyes, the method comprising:

extracting, by one or more processors, a plurality of feature points from a single input image of an object, wherein the input image is acquired by a single camera module;

calculating, by a the one or more processors, an object direction vector associated with the plurality of feature points, the object direction vector corresponding to a front direction of the object; and calculating, by the one or more processors, spatial coordinates of each of the plurality of feature points based on a pre-established reference distance, a feature direction vector, and the object direction vector, outputting, by the one or more processors, spatial coordinates to an auto-stereoscopic display, wherein the pre-established reference distance is associated with a distance between the eyes of is a reference human or a calibrated based on a user setting, wherein the extracted feature points comprise the eyes of the user, wherein the feature direction vector is calculated from the center point of the single camera module to a corresponding feature point, wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

7. The method of claim 6, wherein the calculating of the object direction vector comprises calculating the object direction vector corresponding to a front direction of a human face included in the input image by applying a human face model to the input image.

8. A method of calculating spatial coordinates, the method comprising:

generating, by a single camera module, a single input image by photographing a human face;

extracting, from the input image, a first feature point corresponding to a left eye of the human and a second feature point corresponding to a right eye of the human face;

calculating, by one or more processors, a first feature direction vector from the center point of the camera to the first feature point and a second feature direction vector from the center point of the single camera module to the second feature point; and calculating, by the one or more processors, three dimensional (3D) spatial coordinates of each of the first feature point and the second feature point using a pre-established reference distance, the first feature direction vector, and the second feature direction vector, wherein the pre-established reference distance is associated with a distance between the eyes of a reference human, wherein the first and second feature direction vectors are further calculated based on input camera parameters and pixel position information of the first and second respective feature points, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

9. The method of claim 8, wherein the calculating the first and second feature direction vectors further comprises using a pixel index of each of the first feature point and the second feature point within the input image.

10. A non-transitory computer-readable medium comprising a program for instructing a computer to perform a method of calculating spatial coordinates of a user's eyes, the method comprising:

extracting a plurality of feature points from a single input image of an object, generating the input image by photographing the object with a single camera module configured to;

calculating an object direction vector associated with the plurality of feature points, the object direction vector corresponding to a front direction of the object; and calculating spatial coordinates of each of the plurality of feature points based on a pre-established reference distance, a feature direction vector, and the object direction vector, outputting the spatial coordinates to an auto-stereoscopic display, wherein the pre-established reference distance is associated with a distance between the eyes of a reference human or a calibrated value based on a user setting, wherein the extracted feature points comprise the eyes of the user, wherein the feature direction vector is a vector between the center point of the single camera module and the respective feature point, wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

11. A non-transitory computer-readable medium comprising a program for instructing a computer to perform a method of calculating spatial coordinates, the method comprising:

generating, by a single camera module, a single input image by photographing a human face;

extracting, from the input image, a first feature point corresponding to a left eye of the human face and a second feature point corresponding to a right eye of the human face;

calculating a face direction vector based on a model of a human face and the single input image; and calculating three dimensional (3D) spatial coordinates of each of the first feature point and the second feature point using a pre-established reference distance, a feature direction vector, and the face direction vector, wherein the pre-established reference distance is associated with a distance between a pair of feature points, wherein the feature direction vector is calculated from the center point of the single camera module to a corresponding feature point, wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

12. A method of calculating spatial coordinates, the method comprising:

acquiring a single input image by a single camera module by photographing a human face;

extracting a plurality of feature points corresponding to eyes of the human from the input image;

calculating, by one or more processors, a face direction vector associated with the plurality of feature points; and calculating, by the one or more processors, spatial coordinates of each of the plurality of feature points based on a pre-established reference distance, a feature direction vector, and the face direction vector, wherein the pre-established reference distance is associated with a distance between the eyes of a reference human, wherein the feature direction vector is calculated from the center point of the single camera module to a corresponding feature point;

wherein the feature direction vector is further calculated based on input camera parameters and pixel position information of the respective feature point, wherein the input camera parameters comprise a horizontal field of view of the input image, a vertical field of view of the input image, a horizontal pixel resolution of the input image, and a vertical pixel resolution of the input image, and wherein the pixel position information of the respective feature point comprises a horizontal pixel position and a vertical pixel position.

13. The method of claim 12, wherein the calculating of the face direction vector comprises calculating the face direction vector corresponding to a front direction of the human face included in the single input image by applying a human face model to the input image.

14. The apparatus of claim 3, wherein the image generation apparatus is coupled to a stereoscopic or multi-view three dimensional (3D) display device, the 3D display device being configured to generate a left eye image and a right eye image for selective display to a respectively corresponding left eye and right eye of the human based on the origin direction vectors from the image generation apparatus towards each of the respectively corresponding first feature point and the second feature point.

15. The apparatus of claim 3, wherein a plurality of pre-established reference distances may be stored for selective retrieval according to an identified user.

16. The apparatus of claim 1, wherein the object direction vector is perpendicular to a straight line connecting a first feature point and a second feature point within a human face.

17. The method of claim 8, wherein the calculating the three dimensional (3D) spatial coordinates of the feature points comprises calculating $$\frac{IPD}{|\vec{V_L} - \vec{V_R}|}$$

where IPD is the pre-established reference distance, $\vec{V_L}$ is the first feature direction vector, and $\vec{V_R}$ is the second feature direction vector.

* * * * *